(12) United States Patent
Peng et al.

(10) Patent No.: US 8,189,077 B2
(45) Date of Patent: May 29, 2012

(54) METHOD FOR REDUCING SMEAR EFFECT OF DYNAMIC IMAGE

(75) Inventors: Shih-Yuan Peng, Taipei County (TW); Hsin-Te Wang, Nantou County (TW)

(73) Assignee: Altek Corporation, Hsinchu (TW)

( * ) Notice: Subject to any disclaimer, the term of this patent is extended or adjusted under 35 U.S.C. 154(b) by 470 days.

(21) Appl. No.: 12/608,431

(22) Filed: Oct. 29, 2009

(65) Prior Publication Data

US 2011/0032394 A1 Feb. 10, 2011

(30) Foreign Application Priority Data

Aug. 10, 2009 (TW) ................. 98126847 A

(51) Int. Cl.
*H04N 9/64* (2006.01)
(52) U.S. Cl. ........................ 348/248; 348/249
(58) Field of Classification Search .................. 348/248, 348/249
See application file for complete search history.

(56) References Cited

U.S. PATENT DOCUMENTS

| | | | |
|---|---|---|---|
| 5,614,950 A | 3/1997 | Park et al. | |
| 5,912,482 A | 6/1999 | Morimoto | |
| 6,590,195 B2 | 7/2003 | Nagata | |
| 7,052,029 B2 | 5/2006 | Chamberlain | |
| 7,336,305 B2 | 2/2008 | Suzuki | |
| 7,375,750 B2 | 5/2008 | Suzuki | |
| 2005/0117038 A1* | 6/2005 | Matsuyama | 348/249 |
| 2006/0092283 A1* | 5/2006 | Tanizoe et al. | 348/207.99 |
| 2006/0152607 A1* | 7/2006 | Noguchi | 348/248 |
| 2006/0232692 A1* | 10/2006 | Takane | 348/248 |
| 2006/0274173 A1 | 12/2006 | Yoshida et al. | |
| 2007/0165120 A1* | 7/2007 | Takane | 348/248 |
| 2007/0242145 A1 | 10/2007 | Hazelwood et al. | |
| 2009/0147108 A1* | 6/2009 | Okura et al. | 348/249 |
| 2010/0220225 A1* | 9/2010 | Yu et al. | 348/248 |

* cited by examiner

*Primary Examiner* — David Ometz
*Assistant Examiner* — Dwight C Tejano
(74) *Attorney, Agent, or Firm* — Morris Manning & Martin LLP; Tim Tingkang Xia, Esq.

(57) ABSTRACT

A method for reducing smear effects of a dynamic image is for an image sensor. The image sensor converts a shot image picture into image data, and the image data is divided into an effective region, an upper optical black region (UOB), and a lower optical black region (LOB). The method includes capturing two continuous image data to serve as a first frame image and a second frame image; calculating brightness difference values between individual pixels at corresponding pixel positions of the LOB of the first frame image and the UOB of the second frame image; comparing the brightness difference values with a threshold; obtaining positions to be compensated in the UOB of the second frame image, when the UOB of the second frame image requires brightness compensation; and compensating brightness values of pixels in the effective region of the second frame image corresponding to the positions to be compensated.

18 Claims, 16 Drawing Sheets

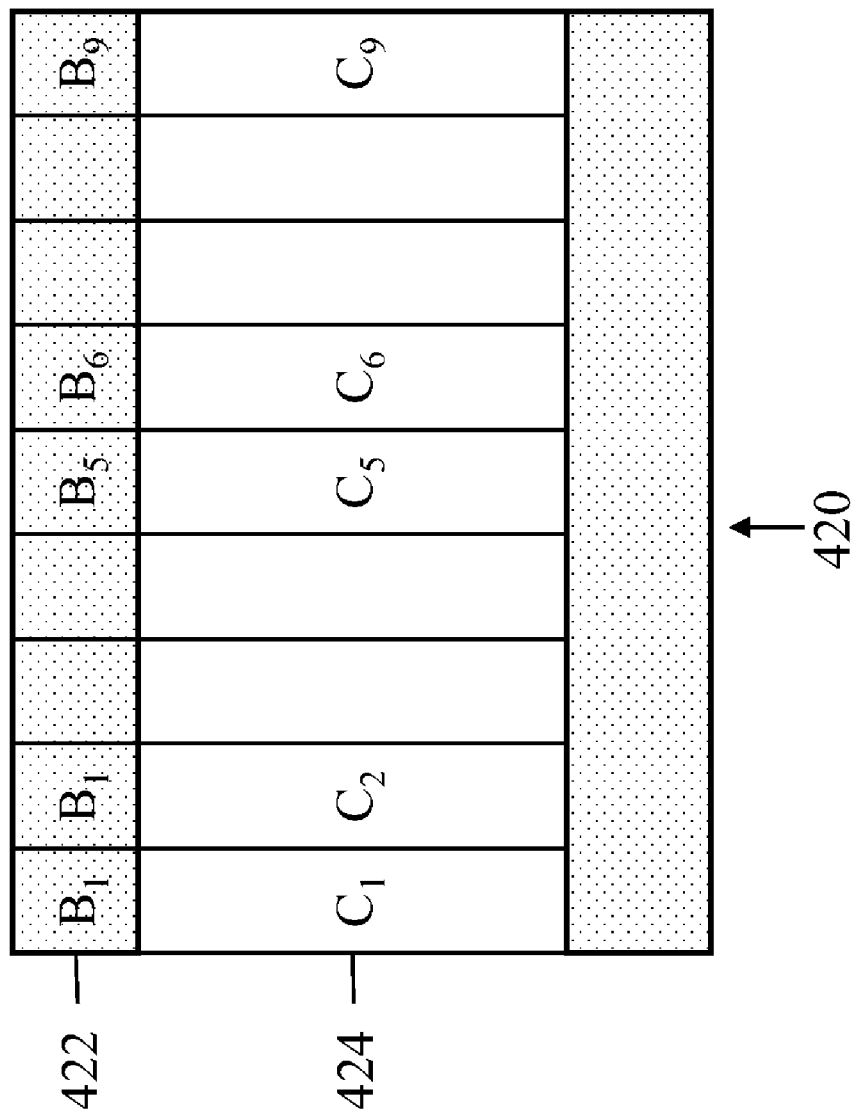

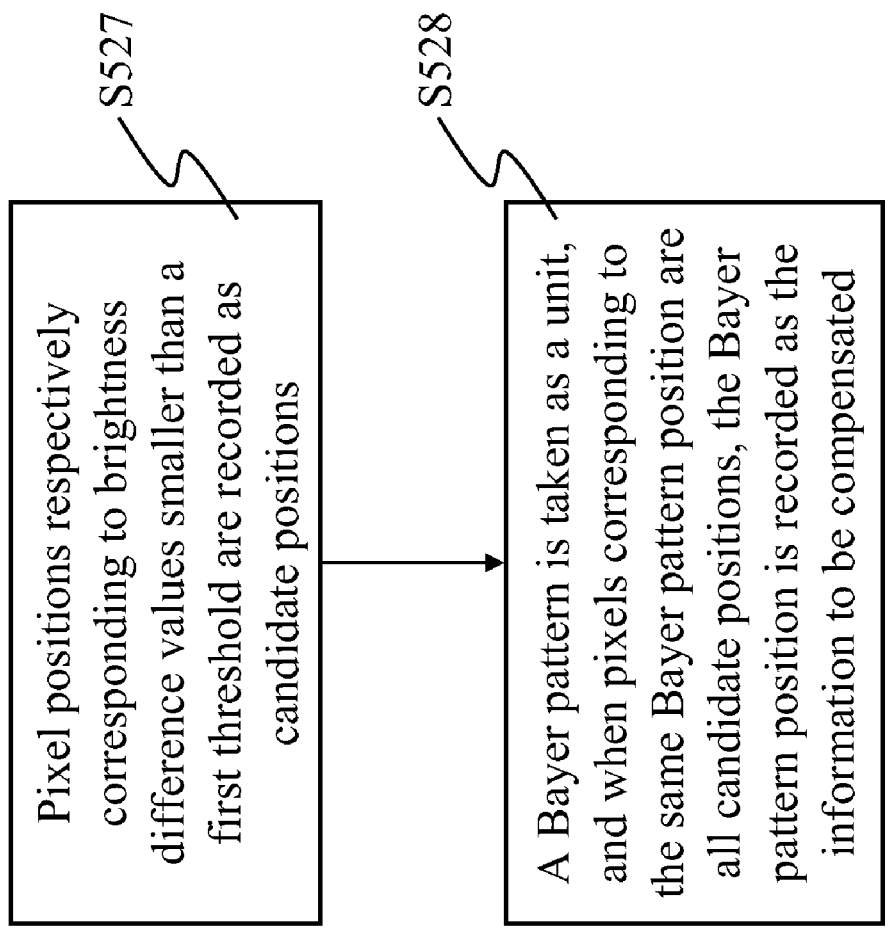

METHOD FOR REDUCING SMEAR EFFECT OF DYNAMIC IMAGE

CROSS-REFERENCE TO RELATED APPLICATIONS

This non-provisional application claims priority under 35 U.S.C. §119(a) on Patent Application No(s). 098126847 filed in Taiwan, R.O.C. on Aug. 10, 2009 the entire contents of which are hereby incorporated by reference.

BACKGROUND OF THE INVENTION

1. Field of the Invention

The present invention relates to a method for reducing a smear effect of an image, and more particularly to a method for reducing a smear effect of a dynamic image.

2. Related Art

Most image sensors applied to digital cameras adopt charge-coupled devices (CCDs). When the image sensor senses a picture having a high brightness object, a smear effect occurs near the corresponding high brightness object. FIG. 1 is a schematic view of image data with a smear effect presented when an image sensor receives a picture having a high brightness object. Referring to FIG. 1, an image sensor 10 has a plurality of sensing pixels 12 arranged in arrays. Once the sensing pixels 12 sense the picture having the high brightness object, an object over-saturated pixel 14 and strip over-saturated pixels 16 are presented among the sensing pixels corresponding to the high brightness object. The object over-saturated pixel 14 and the strip over-saturated pixels 16 are the so-called smear effect.

In order to solve the smear effect problem, persons in the industry have proposed some solutions. For example, in US Patent No. 2006/0274173 A1, published on Dec. 7, 2006 (the patent family includes ROC Patent Application No. 200707327, WO/2006/123828, and so on), a digital camera comprising smear removal function is proposed. As known from the abstract, the following technique is disclosed. A horizontal evaluation data generation section calculates an average value of pixel signals in a vertical optical black region based on given pixel data in the horizontal optical black region and outputs the calculated average value to an evaluation section. A vertical evaluation data generation section calculates an average value of pixel signals in a vertical optical black region based on given pixel data in the vertical optical black region and outputs the calculated average value to the evaluation section. The evaluation section outputs a gain value according to the difference between the two sent average values to a computing section. A smear information memory stores pixel signals in a line in the vertical optical black region. The computing section multiplies the pixel data stored in the smear information memory by the sent gain value, and subtracts the multiplied pixel data from the pixel data imaged by the CCD. Therefore, a camera, a program, and a smear removing device are implemented, so as to change presence of smear removal or intensity of smear removal according to the smear generation state.

In addition, in US Patent Application No. 2007/0242145, published on Oct. 18, 2007 and entitled "Smear Reduction in CCD Images", a technique of removing a smear effect in CCD images is provided. Rates of change of signals in the smeared area are taken as a basis (compared with a predefined limit) for detecting boundaries of the smeared area. After the boundaries are detected, the effective pixels corresponding to the smeared area are compensated by deriving from image pixels neighboring the detected smear or by interpolation.

In the above two methods for removing the smear effect, the smear removal process is merely performed on a single image, but cannot be performed on a part of continuous dynamic images. If the conventional smear removal method is directly used in the continuous dynamic images, the dynamic images may generate an unnatural side effect, such that the picture is too artifact.

SUMMARY OF THE INVENTION

In view of the above problems, the present invention is a method for reducing a smear effect of a dynamic image, which is applicable to perform brightness compensation on the dynamic image by using an upper optical black region located above an effective region and a lower optical black region located below the effective region of a plurality of continuous frames of image data received by an image sensor, thereby effectively lowering the smear effect, reducing an artifact feature, and lowering a side effect etc., so as to solve the problems in the prior art.

Accordingly, the present invention provides a method for reducing a smear effect of a dynamic image, which is applicable to an image sensor. The image sensor converts a shot image picture into image data through a color filter array (CFA), and the image data is divided into an effective region, an upper optical black region located above the effective region, and a lower optical black region located below the effective region. The method comprises: capturing two continuous image data from the image sensor in sequence to serve as a first frame image and a second frame image; individually calculating a brightness difference value of a plurality of corresponding pixels between the upper optical black region of the second frame image and one of the two optical black regions of the first frame image; and compensating pixels in the effective region of the second frame image corresponding to information to be compensated, according to the information to be compensated.

The brightness difference value is calculated by using a formula as follows: $Li=|L(Ai)-L(Bi)|$, in which i is an $i^{th}$ pixel position, Li is a brightness difference value of the $i^{th}$ pixel position, $L(Ai)$ is a brightness value of the $i^{th}$ pixel position of one of the two optical black regions of the first frame image, $L(Bi)$ is a brightness value of the $i^{th}$ pixel position of the upper optical black region of the second frame image, and i is a positive integer.

In the present invention, three embodiments are provided for a step of comparing the brightness difference values with a threshold, so as to obtain the information to be compensated. In a first embodiment, pixel positions respectively corresponding to the brightness difference values smaller than a first threshold are recorded as the information to be compensated. In a second embodiment, the brightness difference values are summed up as a difference sum, in which when the difference sum is smaller than a second threshold, all the pixel positions are recorded as the information to be compensated, and when the difference sum is greater than the second threshold, no pixel position is recorded as the information to be compensated.

In a third embodiment, the CFA satisfies a Bayer pattern, and pixel positions respectively corresponding to the brightness difference values smaller than the first threshold are recorded as candidate positions. The Bayer pattern is taken as a unit, and when pixels corresponding to the same Bayer pattern position are all the candidate positions, the Bayer pattern position is recorded in the information to be compensated.

Furthermore, when the image data converted by the image sensor only has an effective region and a lower optical black region without an upper optical black region, the method for reducing the smear effect of the dynamic image according to the present invention comprises: capturing three continuous image data from an image sensor in sequence to serve as a first frame image, a second frame image, and a third frame image; individually calculating a brightness difference value of a plurality of corresponding pixels between the lower optical black region of the second frame image and the lower optical black region of the first frame image, so as to obtain a plurality of brightness difference values; comparing the brightness difference values with a threshold, so as to obtain information to be compensated; and then, according to the information to be compensated, compensating pixels in the effective region of the third frame image corresponding to the information to be compensated.

In the method for reducing the smear effect of the dynamic image according to the present invention, it is determined whether the image data needs brightness compensation or not and the positions requiring the brightness compensation according to the upper optical black region or the lower optical black region of the image data. The brightness compensation is performed on the positions requiring the brightness compensation, so as to lower the smear effect in the dynamic image, reduce an artifact feature, lower a side effect etc., and improve an image quality, such that a user can manipulate smoothly.

BRIEF DESCRIPTION OF THE DRAWINGS

The present invention will become more fully understood from the detailed description given herein below for illustration only, and thus are not limitative of the present invention, and wherein:

FIG. 6 is a schematic view of information to be compensated according to a first embodiment of Step S520 in the present invention;

FIG. 8A is a schematic flow chart of a third embodiment of Step S520 in the present invention;

DETAILED DESCRIPTION OF THE INVENTION

A method for reducing a smear effect of a dynamic image according to the present invention is applicable to a digital image pickup device having an image sensor. The method may be built in a storage device of the digital image pickup device through software or firmware program, and then the method for reducing the smear effect of the dynamic image according to the present invention is implemented by executing the built-in software or firmware program by a processor of the digital image pickup device. Here, the digital image pickup device may be a digital camera, a mobile phone with an image sensor, or a personal digital assistant (PDA) with an image sensor etc., but the present invention is not limited to the above digital image pickup devices.

Figure 1:
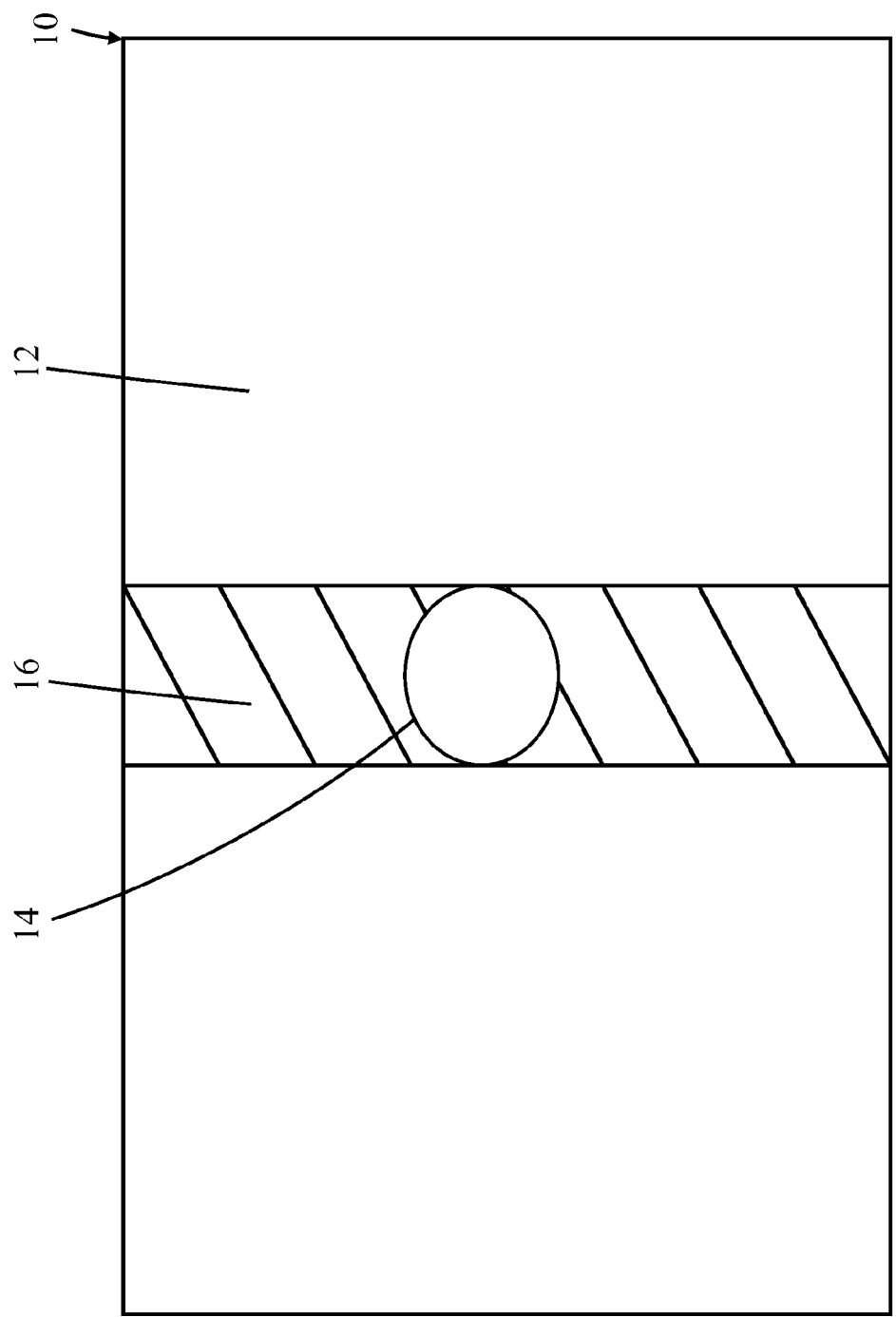
FIG. 1 is a schematic view of image data with a smear effect presented when a conventional image sensor receives a picture having a high brightness object.
Figure 2:
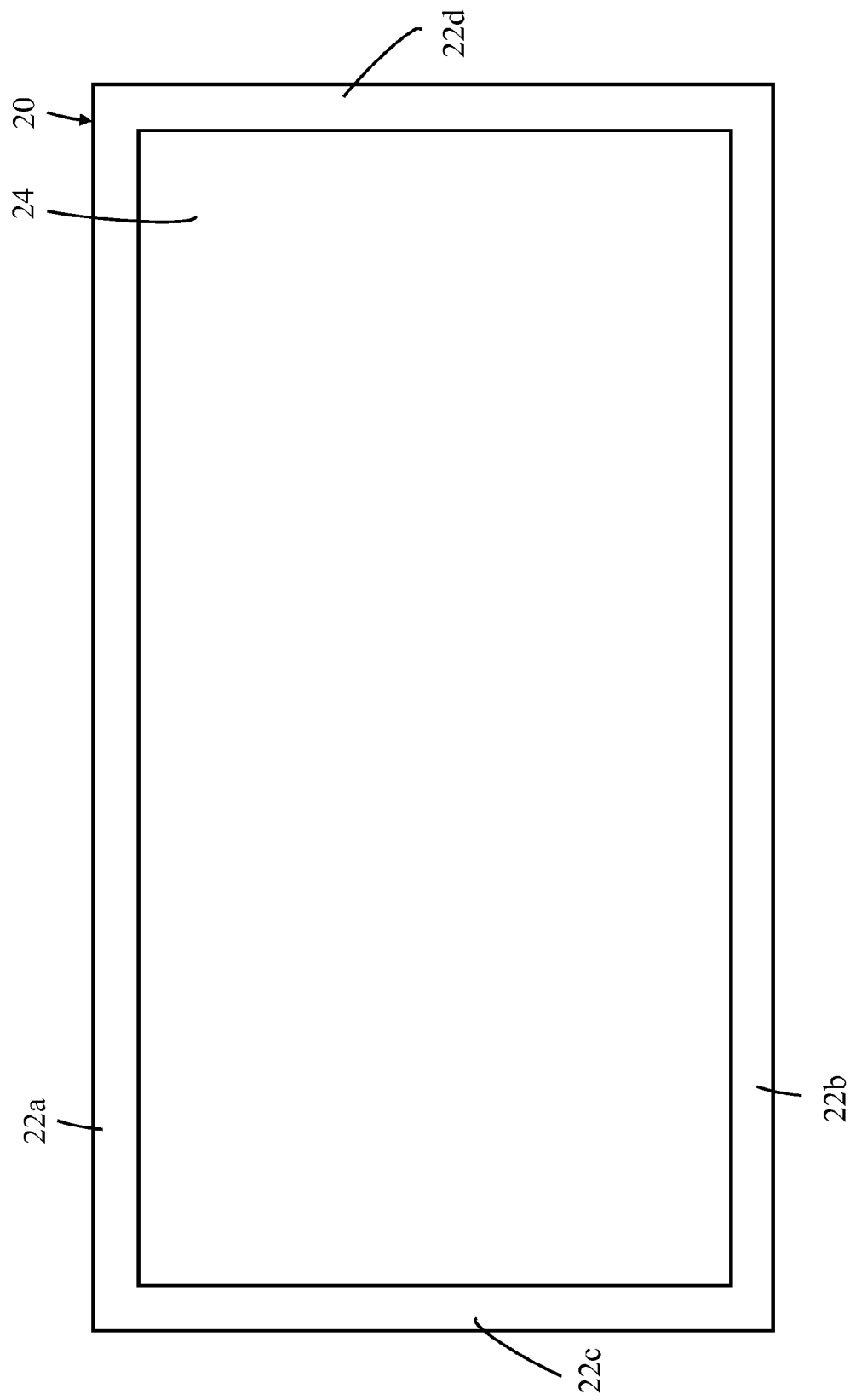
FIG. 2 is a schematic structural view of an image sensor according to an embodiment of the present invention.

FIG. 2 is a schematic structural view of an image sensor according to an embodiment of the present invention. Referring to FIG. 2, an image sensor 20 is, for example, but not limited to, an image sensor applicable to a digital camera. The common image sensor 20 may be, but not limited to, a CCD. The image sensor 20 has optical black regions 22a, 22b, 22c, and 22d and an effective region 24. The optical black regions 22a, 22b, 22c, and 22d are covered by a nontransparent frame body, for example, a metal frame, such that the optical black regions cannot receive light rays, and cannot present image information of shot scenes. In other words, the peripheral edges of the image sensor 20 are covered by the metal frame, so as to form the optical black regions 22a, 22b, 22c, and 22d. Being contrary to the optical black regions 22a, 22b, 22c, and 22d, the effective region 24 directly receives light rays transferred from the shot scenes and then converts into corresponding image data (image signals). During the practical application, a lens and a shutter are further disposed in front of the image sensor 20, so as to control a focal length and an exposure time of the scenes.

Generally, the optical black regions 22a, 22b, 22c, and 22d are divided into vertical optical black regions 22a and 22b and horizontal optical black regions 22c and 22d. The vertical optical black regions 22a and 22b are further divided into an upper optical black region 22a and a lower optical black region 22b. The horizontal optical black regions 22c and 22d are further divided into a left optical black region 22c and a right optical black region 22d.

Most image sensors 20 have four optical black regions 22a, 22b, 22c, and 22d as shown in FIG. 2, but some image sensors do not have the upper optical black region 22a or the lower optical black region 22b. The present invention can be applied to various image sensors 20 having different optical black regions 22a, 22b, 22c, and 22d. In the present invention, different corresponding embodiments are provided and described as follows for the image sensors having different optical black regions 22a, 22b, 22c, and 22d. A first embodiment is applicable to the image sensor 20 having both the upper optical black region 22a and the lower optical black region 22b. A second embodiment is applicable to the image sensor 20 only having the upper optical black region 22a. A third embodiment is applicable to the image sensor 20 only having the lower optical black region 22b.

Figure 3:
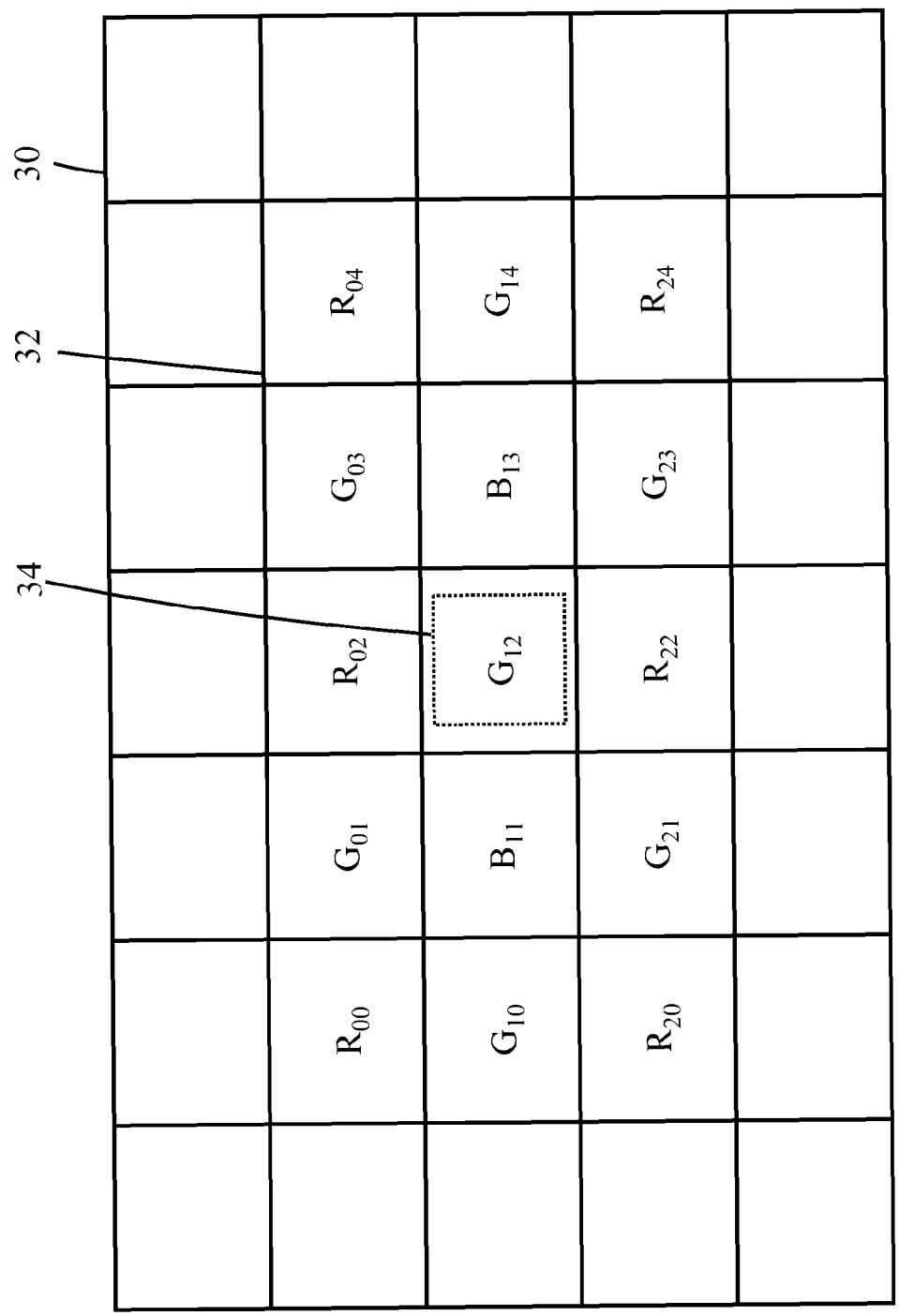
FIG. 3 is a schematic view of a CFA according to an embodiment of the present invention.

FIG. 3 is a schematic view of a CFA according to an embodiment of the present invention. Referring to FIG. 3, a CFA 30 satisfies a Bayer pattern. The CFA 30 has an interpolation computation matrix 32, which is used for defining a range of positions of color pixels for performing interpolation. R, G, and B respectively represent three colors of red, green, and blue, and the subscripts represent coordinates of pixel positions, for example, $G_{12}$ at a position of the central point color pixel 34 represents that merely green pixels exist originally. Through different color pixels and calculation methods (for example, the interpolation), it may be derived that it lacks of a red pixel color value ($R_{12}$) and a blue pixel color value ($B_{12}$). In the embodiments of the present invention, the Bayer pattern is adopted for making description, but the present invention is not limited here.

Figure 4:
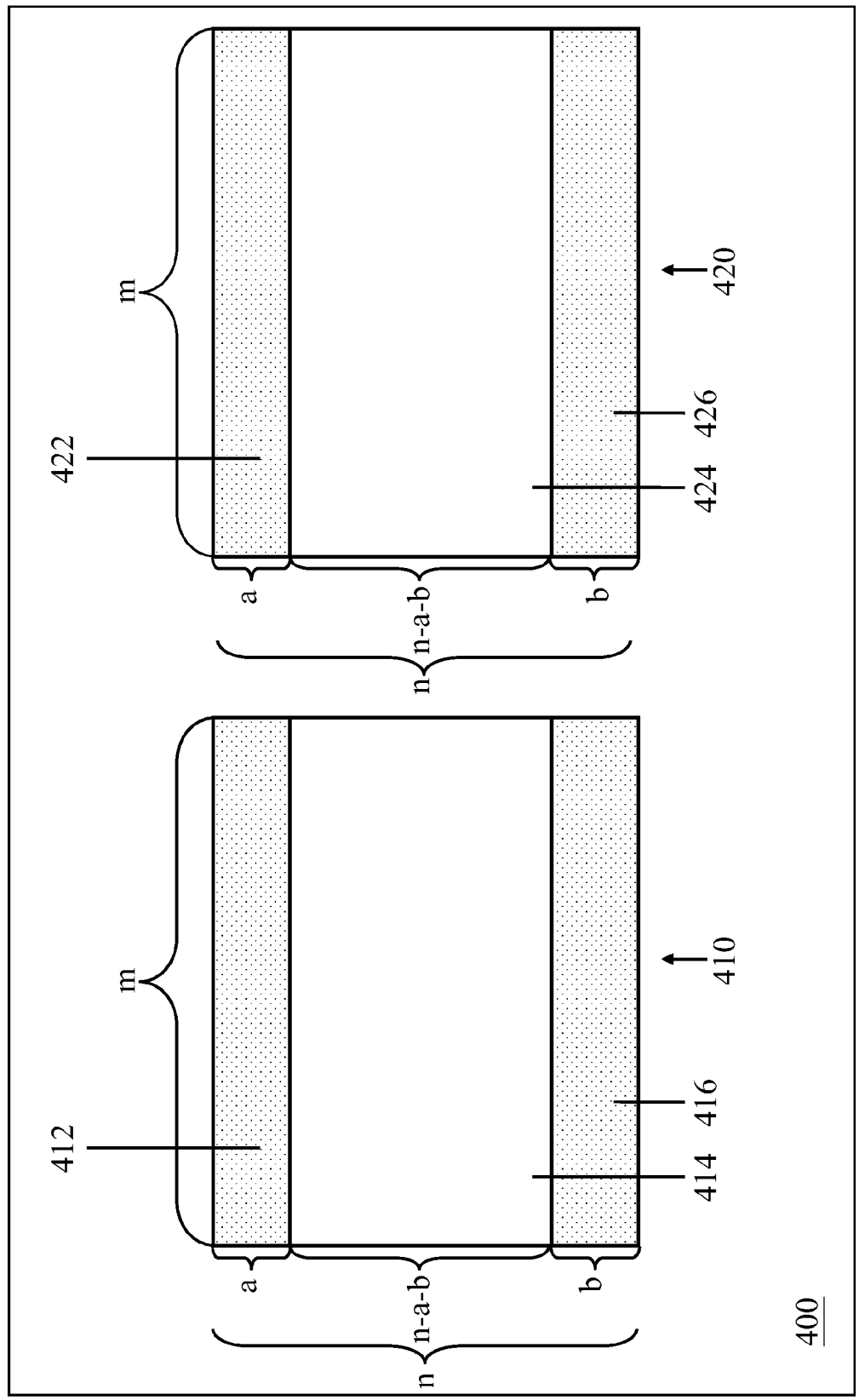
FIG. 4 is a schematic view of a first frame image and a second frame image of image data according to a first embodiment of the present invention.

FIG. 4 is a schematic view of a first frame image and a second frame image of image data according to a first embodiment of the present invention. Referring to FIG. 4, image data 400 comprises a first frame image 410 and a second frame image 420. The first frame image 410 and the second frame image 420 are two continuous frame images of the image data 400, and a time point for capturing the first frame image 410 is earlier than that for capturing the second frame image 420. For example, the first frame image 410 is an image having a size of m*n, and the first frame image 410 is divided into an upper optical black region 412, an effective region 414, and a lower optical black region 416, in which a size of the upper optical black region 412 is m*a, a size of the effective region 414 is m*(n−a−b), and a size of the lower optical black region 416 is m*b. The second frame image 420 is an image having a size of m*n, and the second frame image 420 is divided into an upper optical black region 422, an effective region 424, and a lower optical black region 426, in which a size of the upper optical black region 422 is m*a, a size of the effective region 424 is m*(n-a-b), and a size of the lower optical black region 426 is m*b.

Figure 5A:
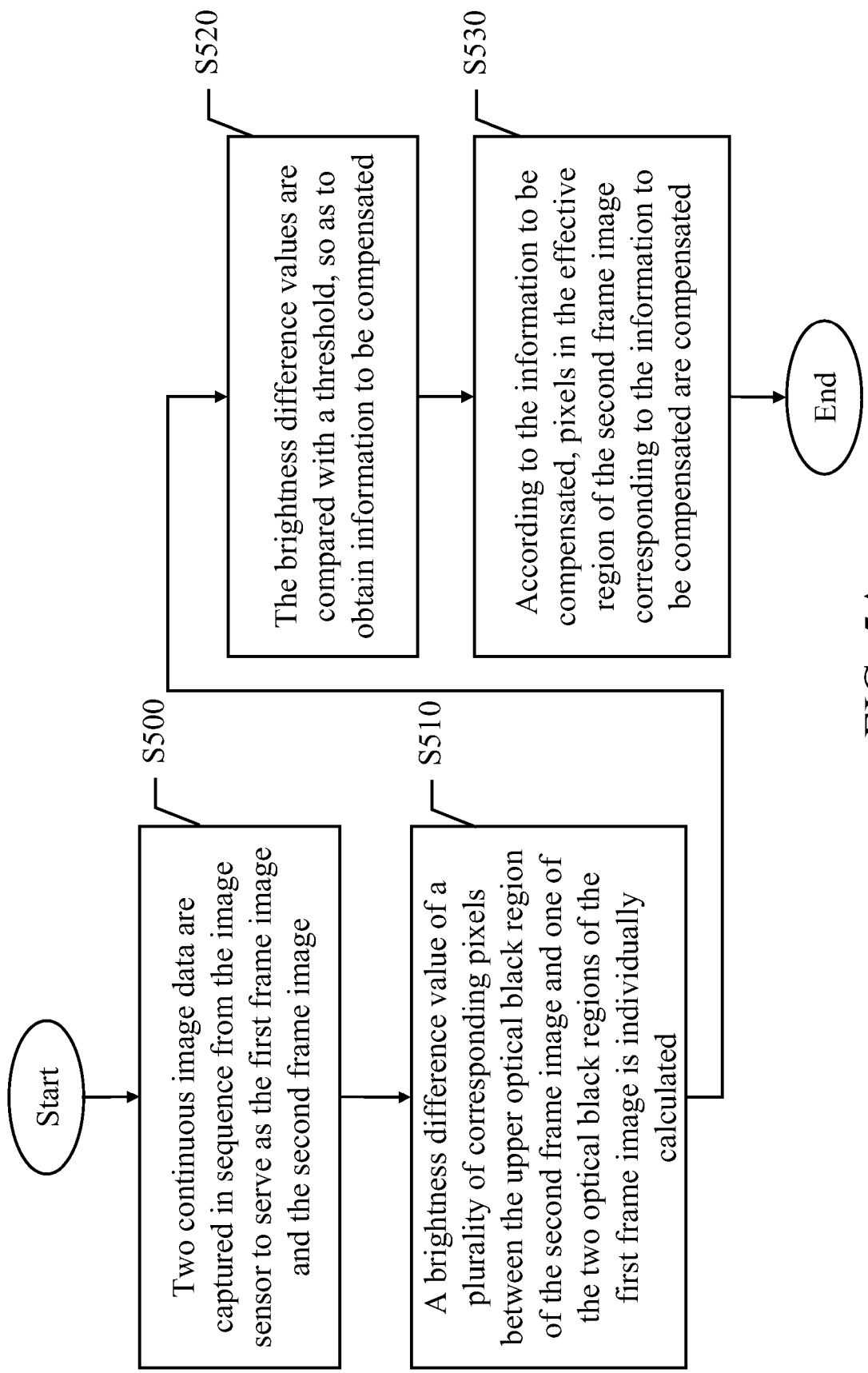
FIG. 5A is a schematic flow chart of the first embodiment of the present invention.

FIG. 5A is a schematic flow chart of the first embodiment of the present invention. Referring to FIG. 5A, the method for reducing the smear effect of the dynamic image according to the present invention is applicable to the image sensor 20. The image sensor converts a shot image picture into image data through the CFA. As described above, the image data comprises an effective region, an upper optical black region located above the effective region, and a lower optical black region located below the effective region. A process of the present invention comprises the following steps.

In Step S500, two continuous image data are captured in sequence from the image sensor 20 to serve as the first frame image 410 and the second frame image 420.

In Step S510, a brightness difference value of a plurality of corresponding pixels between the upper optical black region 422 of the second frame image 420 and one of the two optical black regions 412 and 416 of the first frame image is individually calculated, so as to obtain a plurality of brightness difference values.

In Step S520, the brightness difference values are compared with a threshold, so as to obtain information to be compensated.

In Step S530, according to the information to be compensated, pixels in the effective region of the second frame image 420 corresponding to the information to be compensated are compensated.

One of the two optical black regions 412 and 416 of the first frame image in Step S510 refers to the upper optical black region 412 or the lower optical black region 416, which is, for example, but not limited to, the lower optical black region 416 in the following.

Figures 5B, 5C:
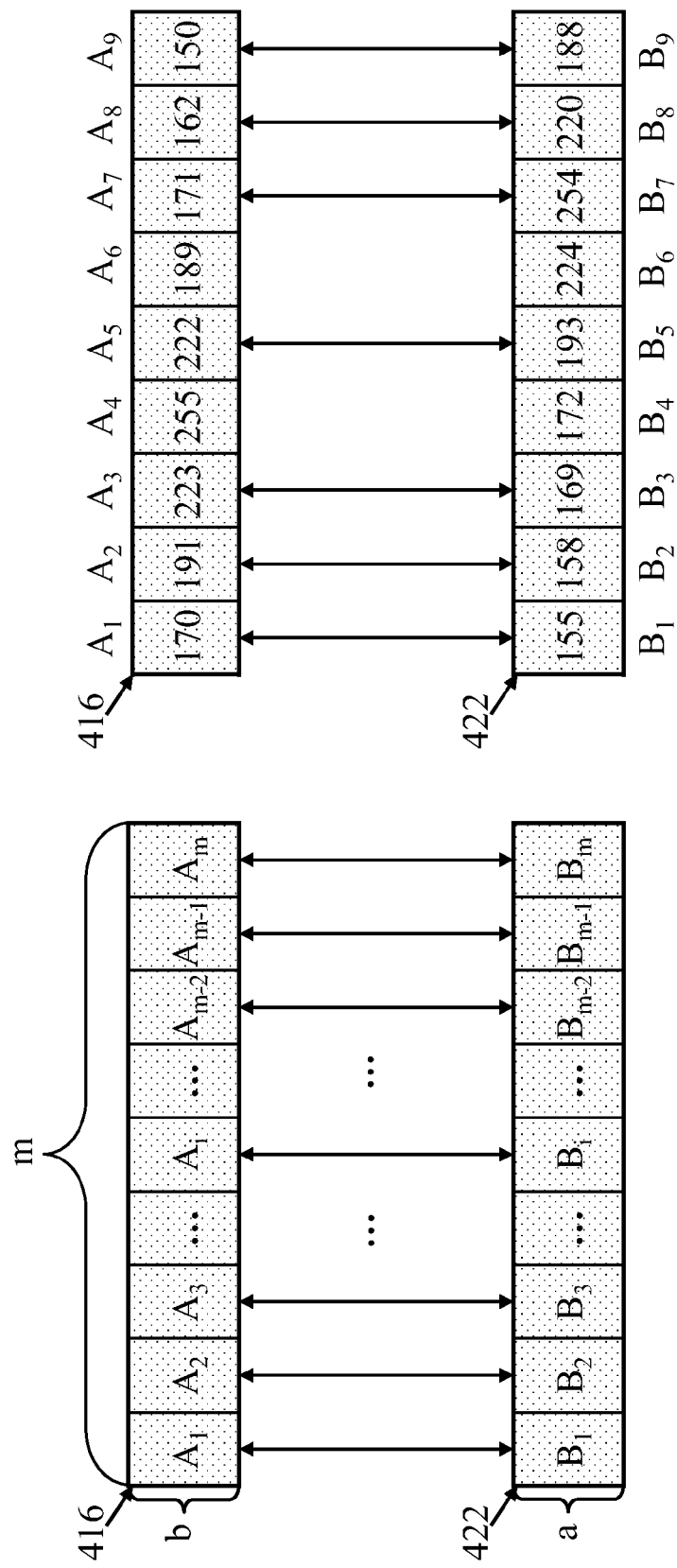
FIG. 5B is a schematic view of corresponding pixel positions according to the first embodiment of the present invention.
FIG. 5C is a schematic view of brightness values of pixel positions according to the first embodiment of the present invention.

A plurality of corresponding pixel positions in Step S510 may be obtained with reference to FIG. 5B, and FIG. 5B is a schematic view of corresponding pixel positions according to the first embodiment of the present invention. The lower optical black region 416 of the first frame image 410 is cut into m blocks having the same size, and the upper optical black region 422 of the second frame image 420 is cut into m blocks having the same size. The blocks $\{A_1, A_2, A_3 \ldots A_i \ldots A_{m-2}, A_{m-1}, \text{and } A_m\}$ in the lower optical black region 416 of the first frame image respectively correspond to the blocks $\{B_1, B_2, B_3 \ldots B_i \ldots B_{m-2}, B_{m-1}, \text{and } B_m\}$ in the upper optical black region 422 of the second frame image.

In addition, the brightness difference values in Step S510 are calculated by using a formula as follows: $Li=|L(Ai)-L(Bi)|$, in which i is an $i^{th}$ (corresponding) pixel position, Li is a brightness difference value of the $i^{th}$ pixel position, L(Ai) is a brightness value of the $i^{th}$ pixel position of the lower optical black region of the first frame image, L(Bi) is a brightness value of the $i^{th}$ pixel position of the upper optical black region of the second frame image, and i is a positive integer.

FIG. 5C is a schematic view of brightness values of pixel positions according to the first embodiment of the present invention. Referring to FIG. 5C, for ease of description, it is assumed that the lower optical black region 416 of the first frame image is cut into 9 blocks having the same size, and block positions are respectively represented as $A_1$ to $A_9$. The upper optical black region 422 of the second frame image is cut into 9 blocks having the same size, and block positions are respectively represented as $B_1$ to $B_9$.

Each pixel position has a pixel brightness value. A pixel brightness value at a position $A_1$ is 170, and a pixel brightness value at a position $B_1$ is 155, such that a brightness difference value between $A_1$ and $B_1$ is |170−155|=15. The brightness difference values of the remaining pixel positions may be derived in the same way, such that the brightness difference values of the corresponding pixel positions between the lower optical black region 416 of the first frame image and the upper optical black region 422 of the second frame image are {15, 33, 54, 83, 29, 35, 83, 58, and 38} in sequence. Therefore, Step S510 is finished, and the plurality of brightness difference values is obtained.

The brightness difference values correspond to the above blocks one by one. Definitely, the present invention is not limited here. The first and second frame images may not be cut into blocks having the same size, but the brightness difference values are directly calculated in a manner of corresponding one pixel to another. In this manner, each brightness difference value corresponds to one pixel position.

In Step S520, the brightness difference values are compared with the threshold, so as to obtain the information to be compensated, which has three embodiments. The three embodiments are described below with reference to FIGS. 6, 7A, 7B, 8A, 8B, and 8C.

In a first embodiment of Step S520, pixel positions respectively corresponding to the brightness difference values smaller than a first threshold are recorded as the information to be compensated. The pixel positions here are the blocks $\{A_1, A_2, A_3 \ldots A_i \ldots A_{m-2}, A_{m-1}, \text{and } A_m\}$ and $\{B_1, B_2, B_3 \ldots B_i \ldots B_{m-2}, B_{m-1}, \text{and } B_m\}$ in FIG. 5B, but the present invention is not limited here.

The threshold in Step S520 is the first threshold in the first embodiment of Step S520. In the embodiment of FIG. 6, the first threshold is set to 50. Therefore, after the first embodiment of Step S520 is executed on the brightness difference values {15, 33, 54, 83, 29, 35, 83, 58, and 38} calculated in FIG. 5C, the pixel positions corresponding to the brightness difference values smaller than the first threshold include $\{B_1, B_2, B_5, B_6, \text{and } B_9\}$, such that the corresponding pixel positions to be recorded as the information to be compensated are $\{B_1, B_2, B_5, B_6, \text{and } B_9\}$.

Next, Step S530 is executed, that is, according to the information to be compensated, pixels in the effective region of the second frame image 420 corresponding to the information to be compensated are compensated. As known from FIG. 6, the pixels in the effective region 424 of the second frame image 420 corresponding to the information to be compensated $\{B_1, B_2, B_5, B_6, \text{and } B_9\}$ are $\{C_1, C_2, C_5, C_6, \text{and } C_9\}$. In Step S530, the pixel positions (blocks) $\{C_1, C_2, C_5, C_6, \text{and } C_9\}$ in the effective region are compensated. The compensation manner may include, but not limited to, (a) subtracting a constant value from the brightness value of each pixel in the region to be compensated, (b) looking up a look-up table to obtain a compensation value to be subtracted from each pixel, and (c) calculating a compensation value to be subtracted from each pixel in a calculating manner. The compensation manners (a), (b), and (c) may be generally referred to as the smear compensation procedure. Accordingly, the brightness values of the pixels in the region are reduced by using the obtained constant value or compensation value, so as to lower the smear effect in the image.

The setting of the first threshold may be determined depending upon artifact visual sense degrees achieved after the compensations are made according to different first thresholds through many experiments. That is to say, a plurality of different first thresholds is set for the same image data, and then it is determined in a manual or computer manner whether the image has distinct artifact visual sense or not after the compensations are made according to the different first thresholds, and then an appropriate first threshold is set. The smaller the threshold is, the less the number of the pixel positions recorded in the information to be compensated will be, that is, fewer pixels are compensated.

Figures 7A, 7B:
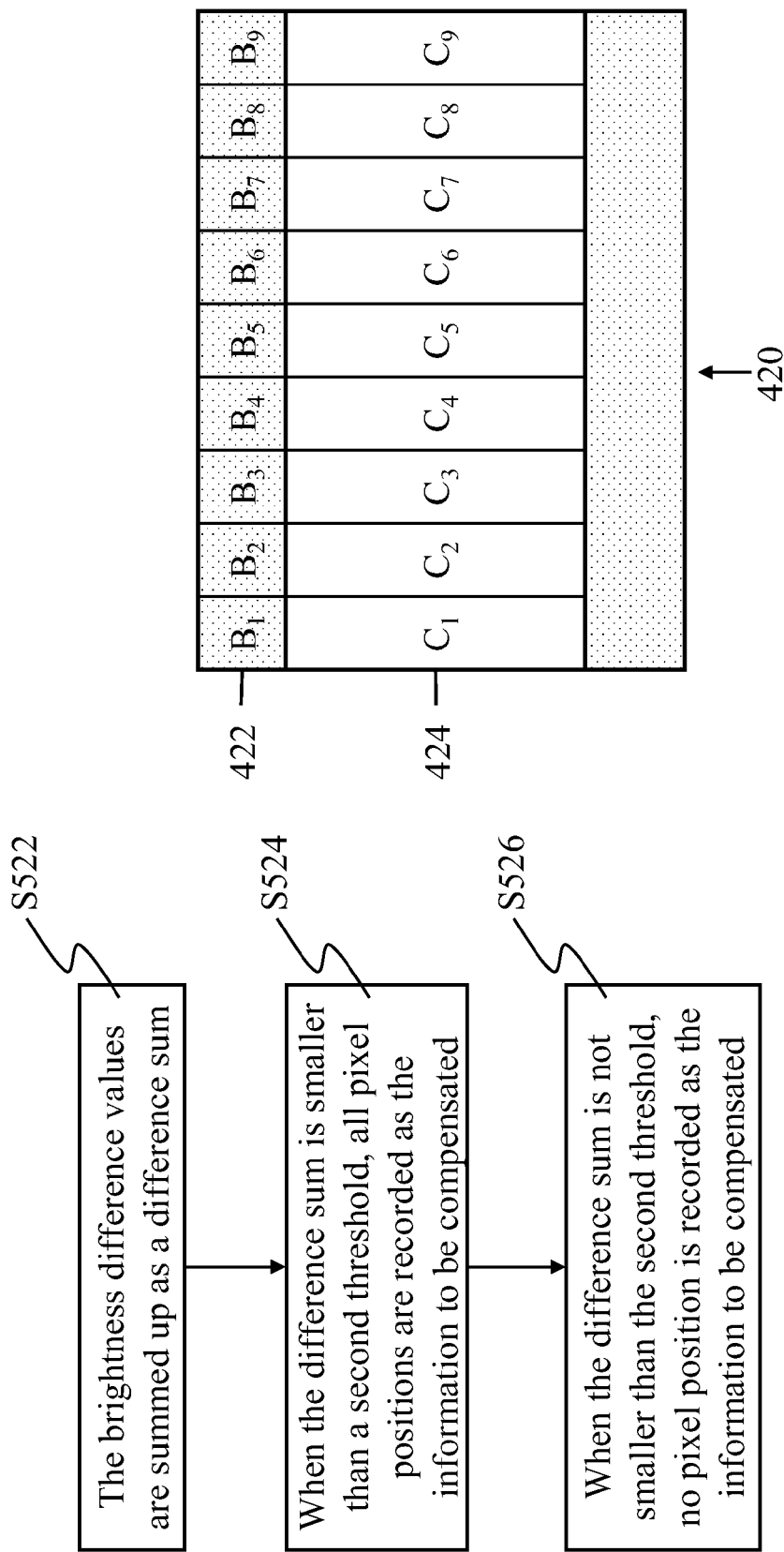
FIG. 7A is a schematic flow chart of a second embodiment of Step S520 in the present invention.
FIG. 7B is a schematic view of information to be compensated according to the second embodiment of Step S520 in the present invention.

Next, referring to FIG. 7A, a second embodiment of Step S520 comprises the following steps. In Step S522, the brightness difference values are summed up as a difference sum. In Step S524, when the difference sum is smaller than a second threshold, all pixel positions are recorded as the information to be compensated. The second embodiment of Step S520 further comprises Step S526, that is, when the difference sum is greater than or equal to (that is, not smaller than) the second threshold, no pixel position is recorded as the information to be compensated.

Referring to FIG. 7B, the second threshold in the second embodiment of Step S520 is, for example, but not limited to, 450.

When Step S522 is executed, the difference values of $\{B_1, B_2, B_3, B_4, B_5, B_6, B_7, B_8, \text{and } B_9\}$ are summed up, and a difference sum of 428 is obtained.

When Step S524 is executed, the difference sum is compared with the second threshold, and when the difference sum is smaller than the second threshold, all the pixel positions are recorded as the information to be compensated. In the second embodiment of Step S520, all pixel positions are compensated or none of the pixel positions are compensated. For example, in FIG. 7B, the difference sum is smaller than the second threshold (428<450), such that the information to be compensated includes $\{B_1, B_2, B_3, B_4, B_5, B_6, B_7, B_8, \text{and } B_9\}$. Therefore, the effective region 424 corresponding to the information to be compensated includes $\{C_1, C_2, C_3, C_4, C_5, C_6, C_7, C_8, \text{and } C_9\}$. That is to say, the whole effective region 424 is compensated.

Figures 8B, 8C:
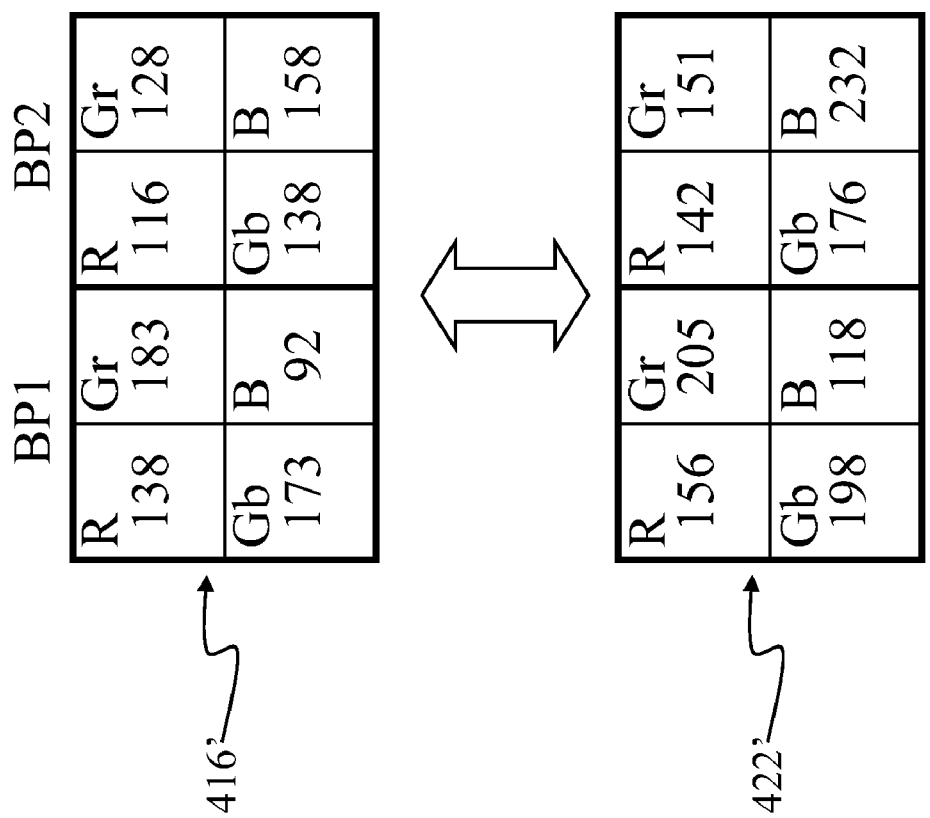
FIG. 8B is a schematic view of brightness values of Bayer pattern positions of a part of a lower optical black region and a part of an upper optical black region according to the third embodiment of Step S520 in the present invention.
FIG. 8C is a schematic view of brightness difference values of the Bayer pattern positions of FIG. 8B.

A third embodiment of Step S520 is described with reference to FIGS. 8A, 8B, and 8C. In FIG. 8B, the CFA of the image sensor is, for example, a Bayer pattern. In this embodiment, a lower optical black region 416' of the first frame image 410 has, for example, only two Bayer patterns (actually, the lower optical black region 416' has a plurality of Bayer patterns). The corresponding Bayer pattern positions thereof are represented as BP1 and BP2 respectively. The Bayer pattern positions here and the pixel positions achieve the same representing manner. That is to say, the positions are represented by taking a Bayer pattern as a unit.

As known from FIG. 8B, four brightness values of the lower optical black region 416' at the Bayer pattern position BP1 are respectively 138, 183, 173, and 92 (respectively corresponding to colors R, Gr, Gb, and B), and four brightness values at the Bayer pattern position BP2 are respectively 116, 128, 138, and 158. Four brightness values of an upper optical black region 422' at the Bayer pattern position BP1 are respectively 156, 205, 198, and 118 (respectively corresponding to colors R, Gr, Gb, and B), and four brightness values at the Bayer pattern position BP2 are respectively 142, 151, 176, and 232.

FIG. 8A is a schematic flow chart of the third embodiment of Step S520. Referring to FIG. 8A, the third embodiment of Step S520 comprises the following steps. In Step S527, pixel positions respectively corresponding to brightness difference values smaller than a first threshold are recorded as candidate positions. In Step S528, a Bayer pattern is taken as a unit, and when pixels corresponding to the same Bayer pattern position are all candidate positions, the Bayer pattern position is recorded as the information to be compensated.

The first threshold of the third embodiment of Step S520 may be, but not limited to, the first threshold of the first embodiment of Step S520. Here, the first threshold in Step S527 is temporarily set to 50.

Referring to FIG. 8C, the brightness difference value of each pixel position after Step S527 is shown. As known from FIG. 8C, the brightness difference values of the four pixel positions (R, Gr, Gb, and B) at the Bayer pattern position BP1 are all smaller than the first threshold. The brightness difference values of the pixel positions R, Gr, and Gb at the Bayer pattern position BP2 are all smaller than the first threshold, but the brightness difference value of the pixel position B at the Bayer pattern position BP2 is greater than the first threshold. Therefore, after Step S527 is executed, except the pixel position B at the Bayer pattern position BP2, the other 7 pixel positions are set to candidate positions.

Next, Step S528 is executed. In Step S528, a Bayer pattern is taken as a unit, and all pixels corresponding to the same Bayer pattern position refer to the four pixel positions at the Bayer pattern position BP1, or the four pixel positions at the Bayer pattern position BP2. The brightness difference values of the four pixel positions at the Bayer pattern position BP1 are all candidate positions, such that the Bayer pattern position BP1 is recorded as the information to be compensated. Next, one of the brightness difference values of the four pixel positions at the Bayer pattern position BP2 is not the candidate position (the brightness difference value of the pixel position B at the BP2 is 74>50), such that the Bayer pattern position BP2 is not recorded as the information to be compensated.

Afterwards, Step S30 is executed, that is, the compensation is performed according to the information to be compensated.

In the third embodiment of Step S520, by taking the Bayer pattern as the unit, the Bayer pattern position is recorded as the position to be compensated, and it is mainly considered that when the strong light received by the image sensor 20 is monochromatic light, all the pixel positions at the same Bayer pattern position do not always have greater brightness difference values. If the compensation is performed at will, the problem of the distinct artifact effect may occur. Instead, in Step S528, when all the pixel positions at the same Bayer pattern position satisfy compensation conditions (the brightness difference values thereof are smaller than the first threshold), the compensation is performed. For example, in FIG. 8C, the brightness difference value of the pixel position B at the Bayer pattern position BP2 is greater, and the pixel position B represents a blue filter. That is to say, this position may receive the stronger blue light. Therefore, the entire Bayer pattern position BP2 is not compensated, thereby preventing the artifact effect.

In the three embodiments of Step S520, in the first and third embodiments, it is determined whether to perform the smear compensation or not by using the individual pixel position or the individual Bayer pattern position, but in the second embodiment of Step S520, it is determined whether to perform the compensation operation or not by using the entire frame image as the unit. The three embodiments are respectively applicable to different dynamic images, shaking situations, and shot scenes.

The first embodiment of the present invention is applicable to the image sensor 20 having both the upper optical black region 22a and the lower optical black region 22b. In Step S520, the lower optical black region 416 or the upper optical black region 412 (any one of the two) of the first frame image 410 is used as a reference for calculating the brightness difference values. When the present invention is practically implemented, in consideration of the time effectiveness and instantaneity of the compensation, the brightness difference values are preferably calculated by using the lower optical black region 416 of the first frame image 410 and the upper optical black region 422 of the second frame image 420. The main reason is that, when the image data is captured in most of the image sensors 20, it is scanned from a top left corner and a top right corner downwards to a bottom left corner and a bottom right corner in FIG. 2 row by row. Therefore, once the lower optical black region 416 of the first frame image 410 has already been captured, the image of the upper optical black region 422 of the second frame image 420 is immediately captured. Therefore, a time interval between the lower optical black region 416 and the upper optical black region 422 is quite short, and the determination and the compensation are more correctly performed based on the lower optical black region 416 and the upper optical black region 422.

Figure 9:
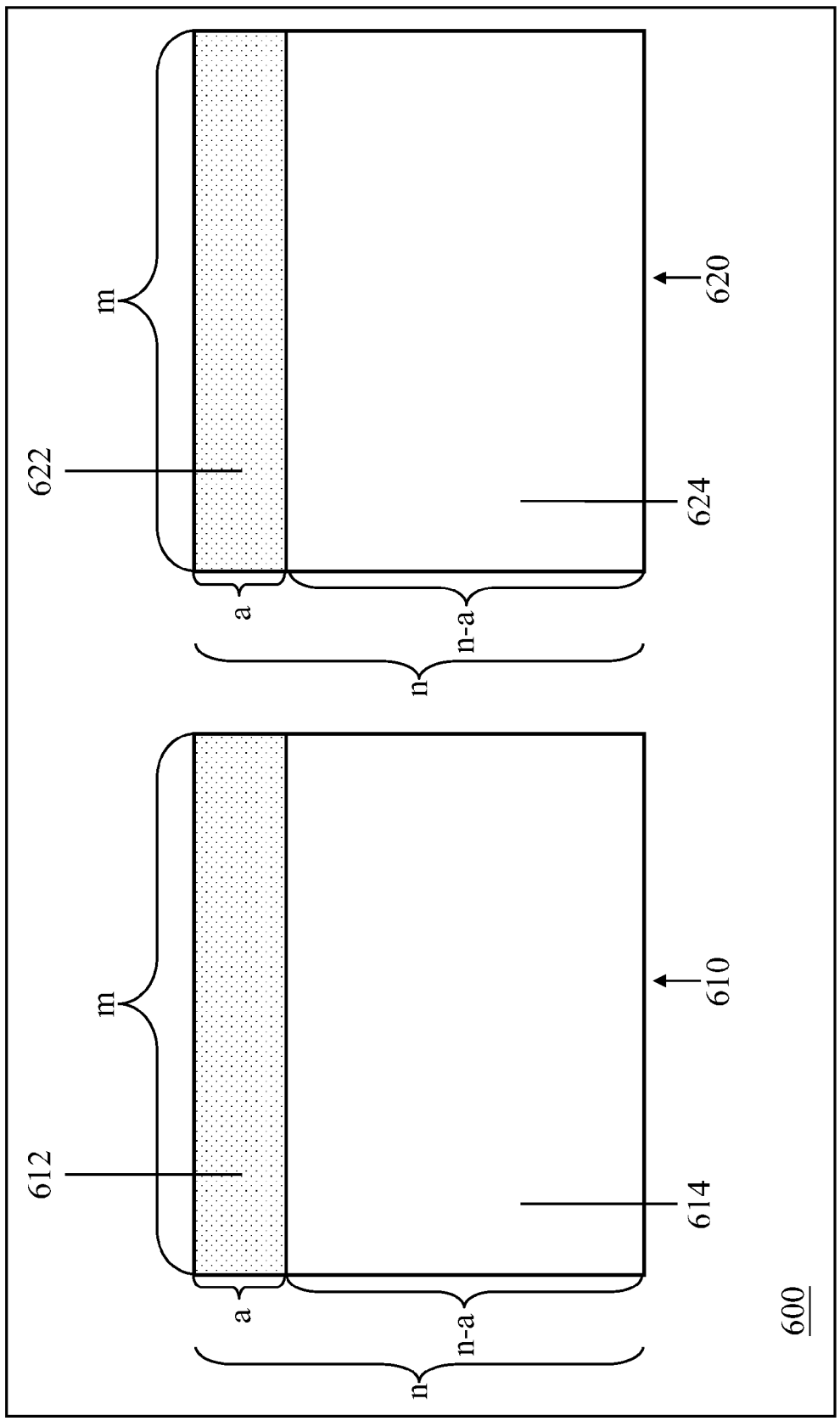
FIG. 9 is a schematic view of a first frame image and a second frame image of image data according to a second embodiment of the present invention.

A second embodiment of the present invention is applicable to an image sensor only having an upper optical black region. FIG. 9 is a schematic view of a first frame image and a second frame image of image data according to a second embodiment of the present invention. Referring to FIG. 9, image data 600 comprises a first frame image 610 and a second frame image 620. The first frame image 610 and the second frame image 620 are two continuous frame images of the image data 600, and the first frame image 610 occurs earlier than the second frame image 620. The first frame image 610 is an image having a size of m*n, and the first frame image 610 is divided into an upper optical black region 612 and an effective region 614, in which a size of the upper optical black region 612 is m*a and a size of the effective region 614 is m*(n−a). The second frame image 620 is an image having a size of m*n, and the second frame image 620 is divided into an upper optical black region 622 and an effective region 624, in which a size of the upper optical black region 622 is m*a and a size of the effective region 624 is m*(n−a).

Figure 10A:
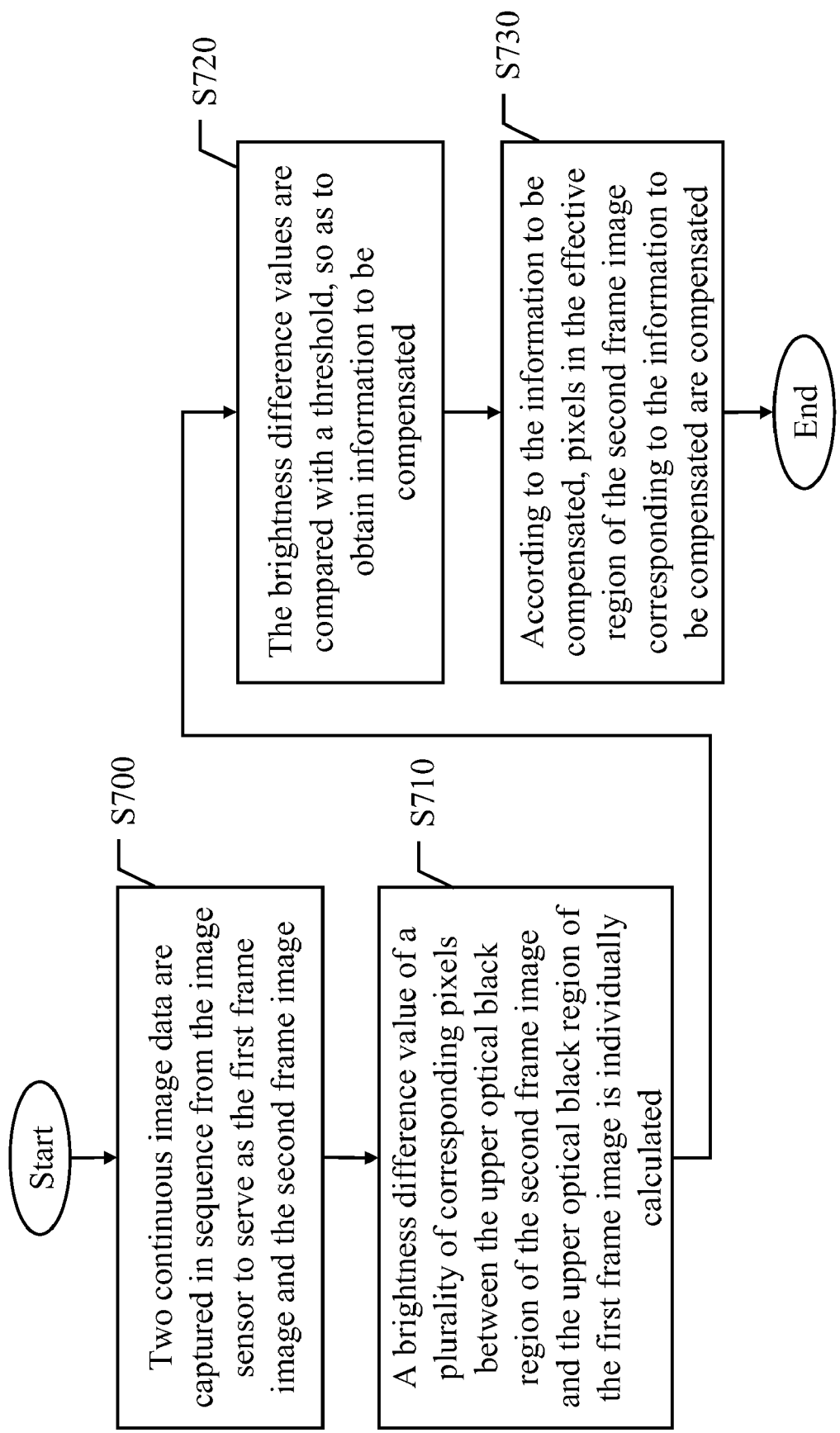
FIG. 10A is a schematic flow chart of the second embodiment of the present invention.

FIG. 10A is a schematic flow chart of the second embodiment of the present invention. Referring to FIG. 10A, the method for reducing the smear effect of the dynamic image according to the present invention is applicable to the image sensor. The image sensor converts a shot image picture into image data through the CFA. As described above, the image data is divided into an effective region and an upper optical black region located above the effective region. A process of the present invention comprises the following steps.

In Step S700, two continuous image data are captured in sequence from the image sensor 20 to serve as the first frame image 610 and the second frame image 620.

In Step S710, a brightness difference value of a plurality of corresponding pixels between the upper optical black region 622 of the second frame image 620 and the upper optical black region 612 of the first frame image 610 is individually calculated, so as to obtain a plurality of brightness difference values.

In Step S720, the brightness difference values are compared with a threshold, so as to obtain information to be compensated.

In Step S730, according to the information to be compensated, pixels in the effective region 624 of the second frame image 620 corresponding to the information to be compensated are compensated.

Figures 10B, 10C:
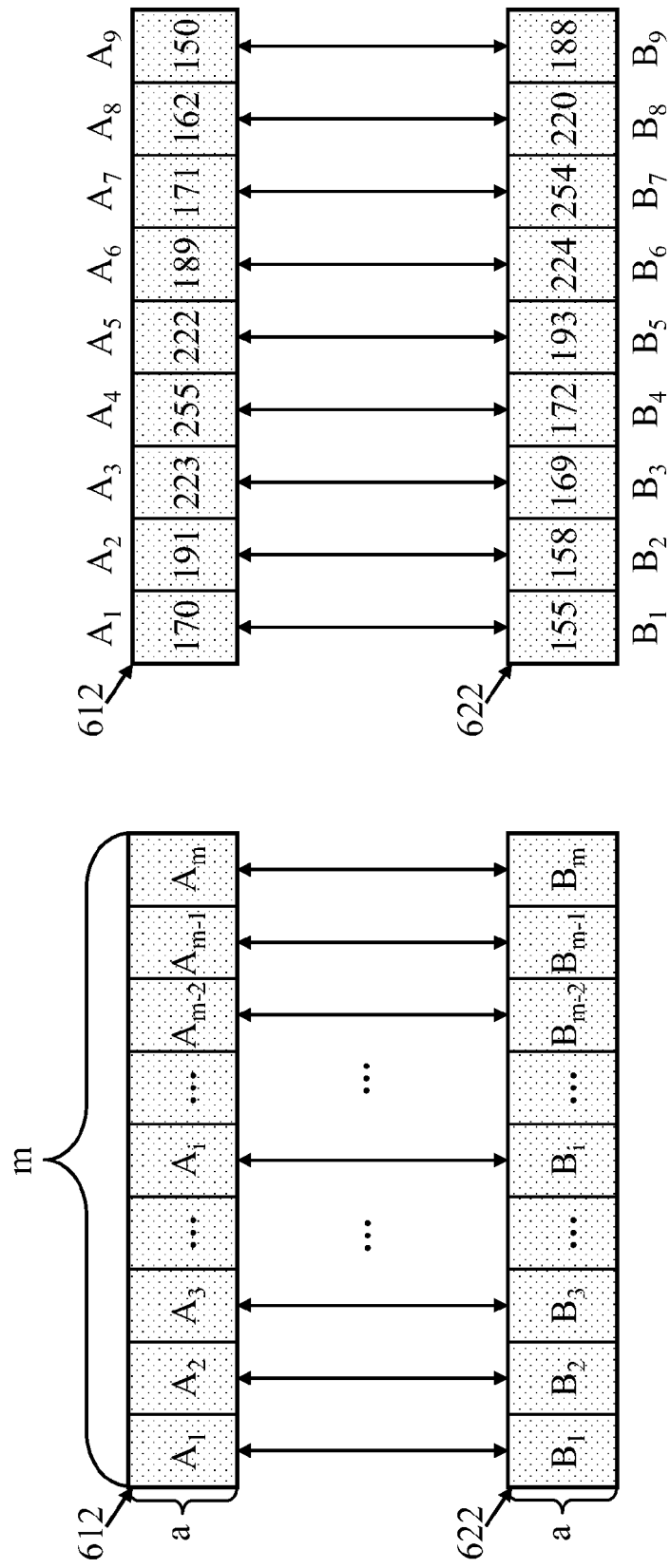
FIG. 10B is a schematic view of corresponding pixel positions according to the second embodiment of the present invention.
FIG. 10C is a schematic view of brightness values of pixel positions according to the second embodiment of the present invention.

A plurality of corresponding pixel positions in Step S710 may be obtained with reference to FIG. 10B, and FIG. 10B is a schematic view of corresponding pixel positions according to another embodiment of the present invention. The upper optical black region 612 of the first frame image is cut into m blocks having the same size, and the upper optical black region 622 of the second frame image is cut into m blocks having the same size. The blocks $\{A_1, A_2, A_3 \ldots A_i \ldots A_{m-2}, A_{m-1}, \text{and } A_m\}$ in the upper optical black region 612 of the first frame image respectively correspond to the blocks $\{B_1, B_2, B_3 \ldots B_i \ldots B_{m-2}, B_{m-1}, \text{and } B_m\}$ in the upper optical black region 622 of the second frame image.

In addition, the brightness difference values in Step S710 are calculated by using a formula as follows: $Li=|L(Ai)-L(Bi)|$, in which i is an $i^{th}$ corresponding pixel position, Li is a brightness difference value of the $i^{th}$ pixel position, L(Ai) is a brightness value of the $i^{th}$ pixel of the upper optical black region of the first frame image, L(Bi) is a brightness value of the $i^{th}$ pixel of the upper optical black region of the second frame image, and i is a positive integer.

FIG. 10C is a schematic view of brightness values of pixel positions according to another embodiment of the present invention. Referring to FIG. 10C, for ease of description, it is assumed that the upper optical black region 612 of the first frame image is cut into 9 blocks having the same size, and block positions are respectively represented as $A_1$ to $A_9$. The upper optical black region 622 of the second frame image is cut into 9 blocks having the same size, and block positions are respectively represented as $B_1$ to $B_9$. Each pixel position has a pixel brightness value. A pixel brightness value at a position $A_1$ is 170, and a pixel brightness value at a position $B_1$ is 155, such that a brightness difference value between $A_1$ and $B_i$ is |170−155|=15. The brightness difference values of the remaining pixel positions may be derived in the same way, such that the brightness difference values of the corresponding pixel positions between the upper optical black region 612 of the first frame image and the upper optical black region 622 of the second frame image are {15, 33, 54, 83, 29, 35, 83, 58, and 38} in sequence.

Step S720 and Step S730 are similar to Step S520 and Step S530, such that the descriptions are not given here.

Figure 11:
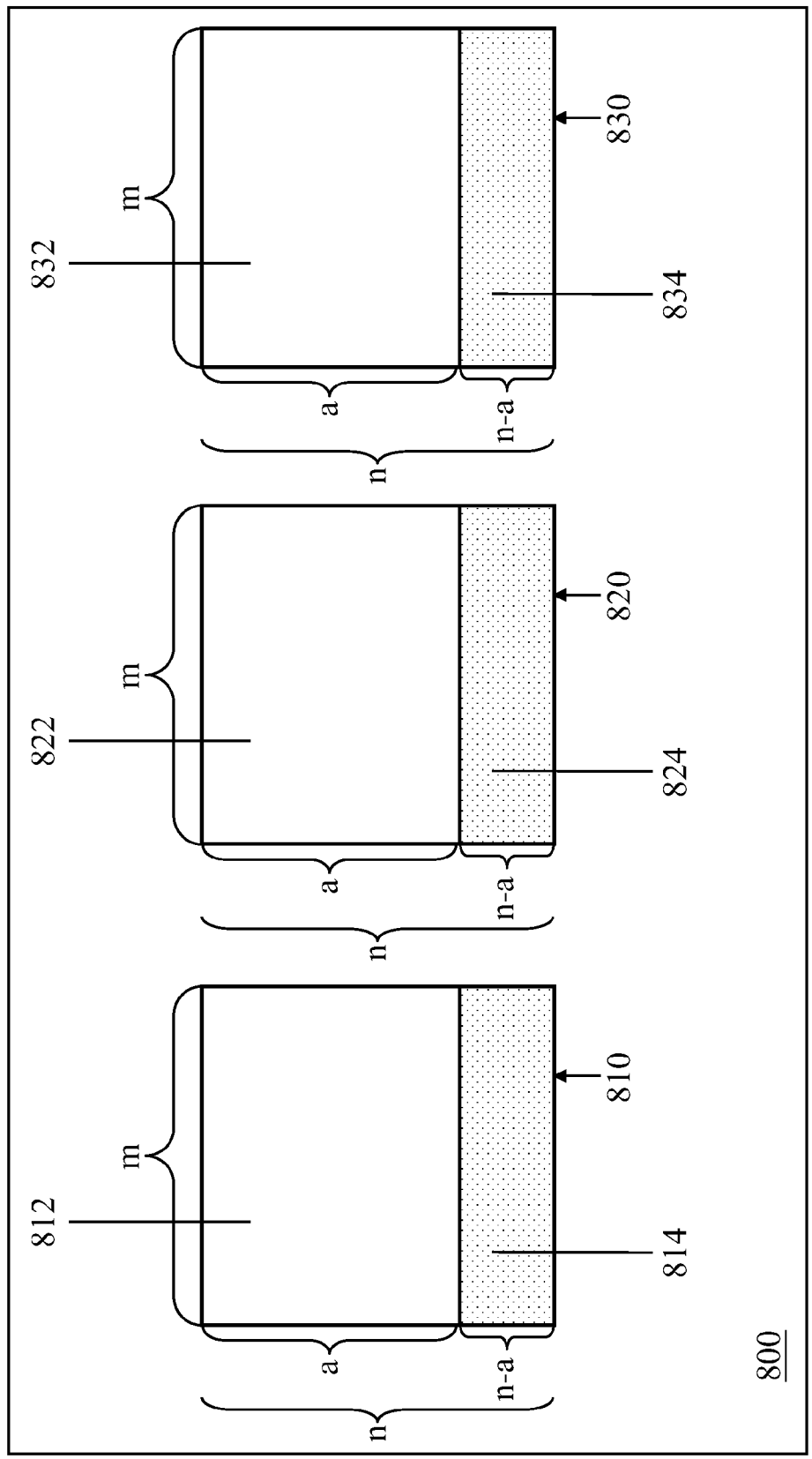
FIG. 11 is a schematic view of a first frame image, a second frame image, and a third frame image of image data according to a third embodiment of the present invention.

A third embodiment of the present invention is applicable to an image sensor 20 only having a lower optical black region. FIG. 11 is a schematic view of a first frame image, a second frame image, and a third frame image of image data according to a third embodiment of the present invention. Referring to FIG. 11, image data 800 comprises a first frame image 810, a second frame image 820, and a third frame image 830. The first frame image 810, the second frame image 820, and the third frame image 830 are three continuous frame images of the image data 800, the first frame image 810 occurs earlier than the second frame image 820, and the second frame image 820 occurs earlier than the third frame image 830. The first frame image 810 is an image having a size of m*n, and the first frame image 810 is divided into an effective region 812 and a lower optical black region 814, in which a size of the effective region 812 is m*a, and a size of the lower optical black region 814 is m*(n−a). The second frame image 820 is an image having a size of m*n, and the second frame image 820 is divided into an effective region 822 and a lower optical black region 824, in which a size of the effective region 822 is m*a and a size of the lower optical black region 824 is m*(n−a). The third frame image 830 is an image having a size of m*n, and the third frame image 830 is divided into an effective region 832 and a lower optical black region 834, in which a size of the effective region 832 is m*a and a size of the lower optical black region 834 is m*(n−a).

Figure 12A:
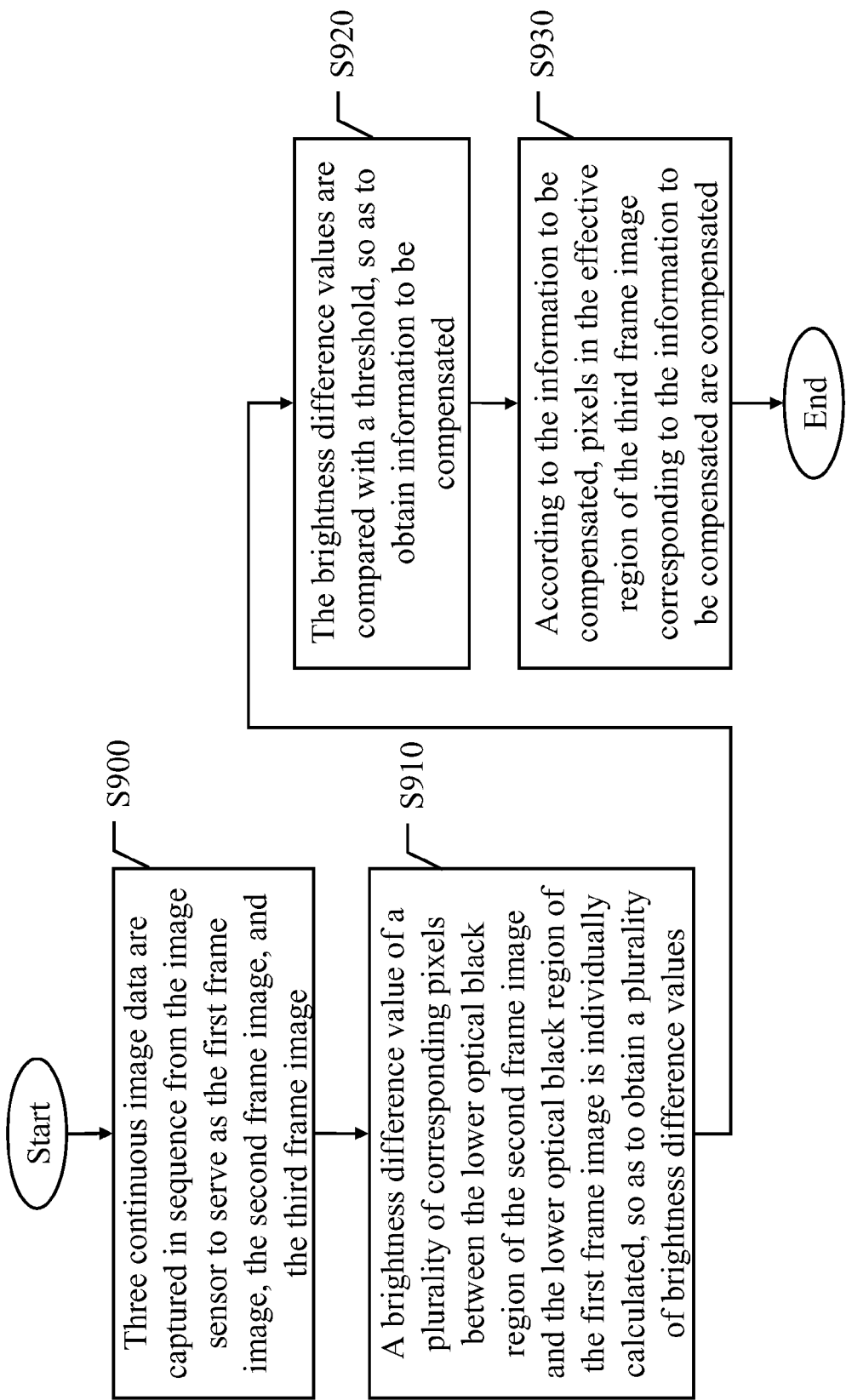
FIG. 12A is an operation flow chart of the third embodiment of the present invention.

FIG. 12A is an operation flow chart of the third embodiment of the present invention. Referring to FIG. 12A, the method for reducing the smear effect of the dynamic image according to the present invention is applicable to the image sensor. The image sensor converts a shot image picture into the image data through the CFA. The image data is divided into an effective region and a lower optical black region located below the effective region. A process of the present invention comprises the following steps.

In Step S900, three continuous image data are captured in sequence from the image sensor 20 to serve as the first frame image, the second frame image, and the third frame image.

In Step S910, a brightness difference value of a plurality of corresponding pixels between the lower optical black region of the second frame image and the lower optical black region of the first frame image is individually calculated, so as to obtain a plurality of brightness difference values.

In Step S920, the brightness difference values are compared with a threshold, so as to obtain information to be compensated.

In Step S930, according to the information to be compensated, pixels in the effective region of the third frame image corresponding to the information to be compensated are compensated.

Figures 12B, 12C:
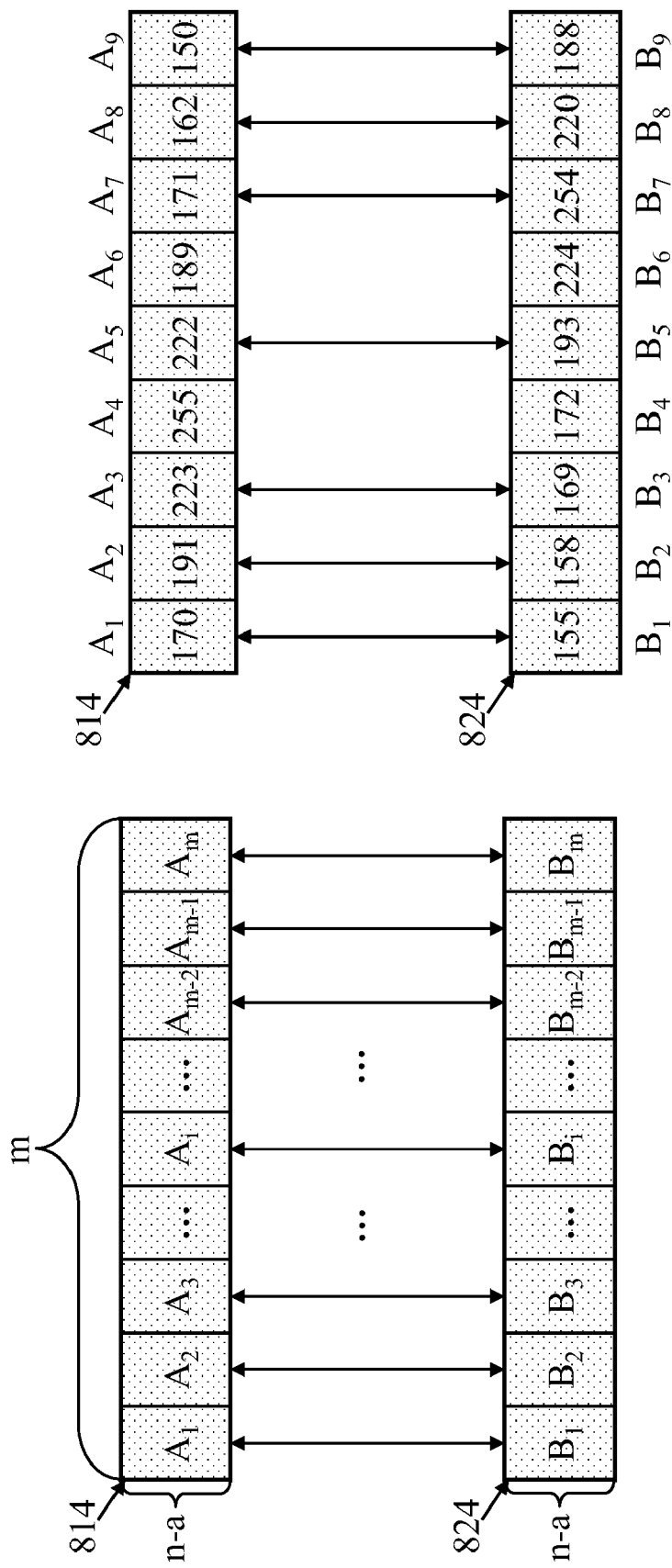
FIG. 12B is a schematic view of corresponding pixel positions according to the third embodiment of the present invention.
FIG. 12C is a schematic view of brightness values of pixel positions according to the third embodiment of the present invention.

A plurality of corresponding pixel positions in Step S910 may be obtained with reference to FIG. 12B, and FIG. 12B is a schematic view of corresponding pixel positions according to still another embodiment of the present invention. The lower optical black region 814 of the first frame image is cut into m blocks having the same size, and the lower black region 824 of the second frame image is cut into m blocks having the same size. The blocks $\{A_1, A_2, A_3 \ldots A_i \ldots A_{m-2}, A_{m-1}, \text{and } A_m\}$ in the lower optical black region 814 of the first frame image respectively correspond to the blocks $\{B_1, B_2, B_3 \ldots B_i \ldots B_{m-2}, B_{m-1}, \text{and } B_m\}$ in the lower optical black region 824 of the second frame image.

In addition, the brightness difference values in Step S910 are calculated by using a formula as follows: Li=|L(Ai)−L(Bi)|, in which i is an $i^{th}$ corresponding pixel position, Li is a brightness difference value of the $i^{th}$ pixel position, L(Ai) is a brightness value of the $i^{th}$ pixel of the lower optical black region of the first frame image, L(Bi) is a brightness value of the $i^{th}$ pixel of the lower optical black region of the second frame image, and i is a positive integer.

FIG. 12C is a schematic view of brightness values of pixel positions according to still another embodiment of the present invention. Referring to FIG. 12C, for ease of description, it is assumed that the lower optical black region 814 of the first frame image is cut into 9 blocks having the same size, and block positions are respectively represented as $A_1$ to $A_9$. The lower optical black region 824 of the second frame image is cut into 9 blocks having the same size, and block positions are respectively represented as $B_1$ to $B_9$. Each pixel position has a pixel brightness value. A pixel brightness value at a position $A_1$ is 170, and a pixel brightness value at a position $B_1$ is 155, such that a brightness difference value between $A_1$ and $B_i$ is |170−155|=15. The brightness difference values of the remaining pixel positions may be derived in the same way, such that the brightness difference values of the corresponding pixel positions between the lower optical black region 814 of the first frame image and the lower optical black region 824 of the second frame image are {15, 33, 54, 83, 29, 35, 83, 58, and 38} in sequence.

Step S920 and Step S930 are similar to Step S520 and Step S530, such that the descriptions thereof are not given here.

The above technical means of the present invention is applicable to different image sensors 20 (for example, having both the upper optical black region and the lower optical black region, only having the upper optical black region, or only having the lower optical black region) to realize the detection and compensation of the smear effect. Meanwhile, the compensation can be selectively performed by using the individual pixel position, the individual Bay pattern position, or the entire frame image. Furthermore, through the real-time detection of the lower optical black region of the first frame image and the upper optical black region of the second frame image, the smear effect of the dynamic image can be detected in a time-effective way, so as to prevent the over-compensated artifact visual sense.

What is claimed is:

1. A method for reducing a smear effect of a dynamic image, applicable to an image sensor, wherein the image sensor converts a shot image picture into image data through a color filter array (CFA), and the image data has a plurality of pixels and comprises an effective region, an upper optical black region located above the effective region, and a lower optical black region located below the effective region, the method comprising:

capturing two continuous image data from the image sensor in sequence to serve as a first frame image and a second frame image;

individually calculating a brightness difference value of a plurality of corresponding pixels between an upper optical black region of the second frame image and one of two optical black regions of the first frame image, so as to obtain a plurality of brightness difference values;

comparing the brightness difference values with a threshold to obtain information to be compensated; and compensating pixels in an effective region of the second frame image corresponding to the information to be compensated, according to the information to be compensated.

2. The method for reducing a smear effect of a dynamic image according to claim 1, wherein the step of calculating the brightness difference values is performed by using a formula as follows:

$$Li = |L(Ai) - L(Bi)|,$$

wherein i is an $i^{th}$ pixel position, Li is a brightness difference value of the $i^{th}$ pixel position, L(Ai) is a brightness value of the $i^{th}$ pixel position of one of the optical black regions of the first frame image, L(Bi) is a brightness value of the $i^{th}$ pixel position of the upper optical black region of the second frame image, and i is a positive integer.

3. The method for reducing a smear effect of a dynamic image according to claim 2, wherein the step of comparing the brightness difference values with the threshold to obtain the information to be compensated comprises:

recording pixel positions respectively corresponding to brightness difference values smaller than a first threshold as the information to be compensated.

4. The method for reducing a smear effect of a dynamic image according to claim 2, wherein the CFA satisfies a Bayer pattern, and the step of comparing the brightness difference values with the threshold to obtain the information to be compensated comprises:

recording pixel positions respectively corresponding to brightness difference values smaller than a first threshold as candidate positions; and by taking one Bayer pattern as a unit, when pixels corresponding to the same Bayer pattern position are all candidate positions, recording the Bayer pattern position as the information to be compensated.

5. The method for reducing a smear effect of a dynamic image according to claim 2, wherein the step of comparing the brightness difference values with the threshold to obtain the information to be compensated comprises:

summing up the brightness difference values as a difference sum; and recording all pixel positions as the information to be compensated, when the difference sum is smaller than a second threshold.

6. The method for reducing a smear effect of a dynamic image according to claim 5, further comprising:

recording no pixel position as the information to be compensated, when the difference sum is not smaller than the second threshold.

7. A method for reducing a smear effect of a dynamic image, applicable to an image sensor, wherein the image sensor converts a shot image picture into image data through a color filter array (CFA), and the image data has a plurality of pixels and comprises an effective region and a lower optical black region located below the effective region, the method comprising:

capturing three continuous image data from the image sensor in sequence to serve as a first frame image, a second frame image, and a third frame image;

individually calculating a brightness difference value of a plurality of corresponding pixels between a lower optical black region of the second frame image and a lower optical black region of the first frame image, so as to obtain a plurality of brightness difference values;

comparing the brightness difference values with a threshold to obtain information to be compensated; and compensating pixels in an effective region of the third frame image corresponding to the information to be compensated, according to the information to be compensated.

8. The method for reducing a smear effect of a dynamic image according to claim 7, wherein the step of calculating the brightness difference values is performed by using a formula as follows:

$$Li = |L(Ai) - L(Bi)|,$$

wherein i is an $i^{th}$ pixel position, Li is a brightness difference value of the $i^{th}$ pixel position, L(Ai) is a brightness value of the $i^{th}$ pixel position of the lower optical black region of the first frame image, L(Bi) is a brightness value of the $i^{th}$ pixel position of the lower optical black region of the second frame image, and i is a positive integer.

9. The method for reducing a smear effect of a dynamic image according to claim 8, wherein the step of comparing the brightness difference values with the threshold to obtain the information to be compensated comprises:

recording pixel positions respectively corresponding to brightness difference values smaller than a first threshold as the information to be compensated.

10. The method for reducing a smear effect of a dynamic image according to claim 8, wherein the CFA satisfies a Bayer pattern, and the step of comparing the brightness difference values with the threshold to obtain the information to be compensated comprises:

recording pixel positions respectively corresponding to brightness difference values smaller than a first threshold as candidate positions; and by taking one Bayer pattern as a unit, when pixels corresponding to the same Bayer pattern position are all candidate positions, recording the Bayer pattern position as the information to be compensated.

11. The method for reducing a smear effect of a dynamic image according to claim 8, wherein the step of comparing the brightness difference values with the threshold to obtain the information to be compensated comprises:

summing up the brightness difference values as a difference sum; and recording all pixel positions as the information to be compensated, when the difference sum is smaller than a second threshold.

12. The method for reducing a smear effect of a dynamic image according to claim 11, further comprising:

recording no pixel position as the information to be compensated, when the difference sum is not smaller than the second threshold.

13. A method for reducing a smear effect of a dynamic image, applicable to an image sensor, wherein the image sensor converts a shot image picture into image data through a color filter array (CFA), and the image data has a plurality of pixels and comprises an effective region and an upper optical black region located above the effective region, the method comprising:

capturing two continuous image data from the image sensor in sequence to serve as a first frame image and a second frame image;

individually calculating a brightness difference value of a plurality of corresponding pixels between an upper optical black region of the second frame image and an upper optical black region of the first frame image, so as to obtain a plurality of brightness difference values;

comparing the brightness difference values with a threshold to obtain information to be compensated; and compensating pixels in an effective region of the second frame image corresponding to the information to be compensated, according to the information to be compensated.

14. The method for reducing a smear effect of a dynamic image according to claim 13, wherein the step of calculating the brightness difference values is performed by using a formula as follows:

$$Li=|L(Ai)-L(Bi)|,$$

wherein i is an $i^{th}$ pixel position, Li is a brightness difference value of the $i^{th}$ pixel position, L(Ai) is a brightness value of the $i^{th}$ pixel position of the upper optical black region of the first frame image, L(Bi) is a brightness value of the $i^{th}$ pixel position of the upper optical black region of the second frame image, and i is a positive integer.

15. The method for reducing a smear effect of a dynamic image according to claim 14, wherein the step of comparing the brightness difference values with the threshold to obtain the information to be compensated comprises:

recording pixel positions respectively corresponding to brightness difference values smaller than a first threshold as the information to be compensated.

16. The method for reducing a smear effect of a dynamic image according to claim 14, wherein the CFA satisfies a Bayer pattern, and the step of comparing the brightness difference values with the threshold to obtain the information to be compensated comprises:

recording pixel positions respectively corresponding to brightness difference values smaller than a first threshold as candidate positions; and by taking one Bayer pattern as a unit, when pixels corresponding to the same Bayer pattern position are all candidate positions, recording the Bayer pattern position as the information to be compensated.

17. The method for reducing a smear effect of a dynamic image according to claim 14, wherein the step of comparing the brightness difference values with the threshold to obtain the information to be compensated comprises:

summing up the brightness difference values as a difference sum; and recording all pixel positions as the information to be compensated, when the difference sum is smaller than a second threshold.

18. The method for reducing a smear effect of a dynamic image according to claim 17, further comprising:

recording no pixel position as the information to be compensated, when the difference sum is greater than or equal to the second threshold.

* * * * *